March 6, 1934.    G. M. CROSSEN    1,949,784

VALVE

Filed April 22, 1932    2 Sheets-Sheet 1

Inventor
GEORGE M. CROSSEN
By his Attorneys

March 6, 1934. G. M. CROSSEN 1,949,784
VALVE
Filed April 22, 1932 2 Sheets-Sheet 2

Inventor
GEORGE M. CROSSEN
By his Attorneys
Merchant & Kilgore

Patented Mar. 6, 1934

1,949,784

UNITED STATES PATENT OFFICE 1,949,784

VALVE

George M. Crossen, Minneapolis, Minn.

Application April 22, 1932, Serial No. 606,923

4 Claims. (Cl. 277—68)

My present invention relates to valves of the type generally employed in steam and water lines, and, generally stated, the invention consists of novel devices, combination of devices and arrangement of parts, hereinafter described and defined in the claims.

Among the important objects of the invention is the provision of relatively inexpensive and simple valves of the class described in which those parts subject to wear or deterioration may be conveniently and inexpensively removed and replaced. The above and several other very important objects and advantages will be clearly pointed out in the accompanying specification and claims.

In the accompanying drawings, which illustrate the invention, like characters indicate like parts throughout the several views.

Referring to the drawings.

Figure 1:
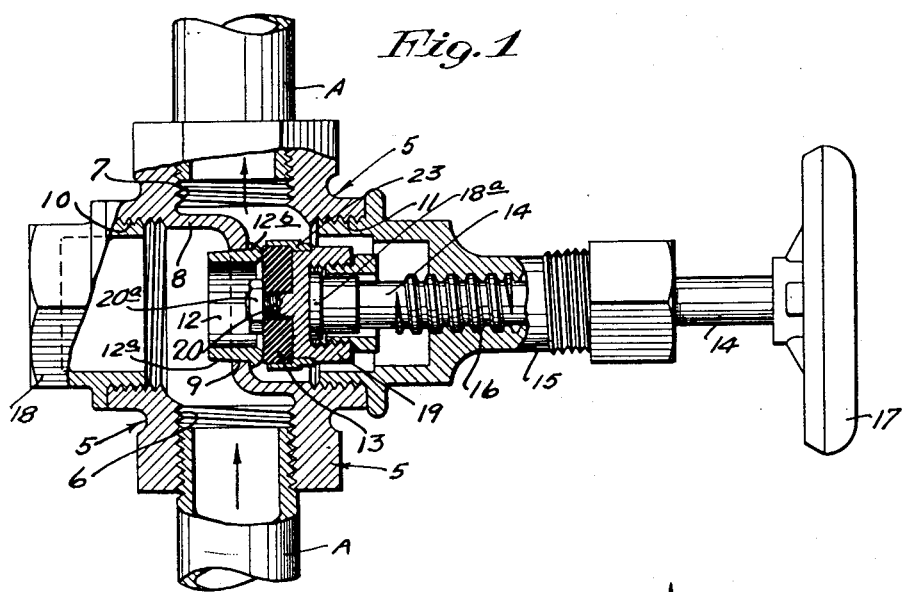
Fig. 1 is a view illustrating one of my improved valves in operative position in a pipe line, some parts being shown in side elevation, some parts being shown in axial section, and some parts being broken away.

The hollow body or casing of the valve is indicated as an entirety by the numeral 5. This body 5 is formed with an inlet port 6, an outlet port 7, and a partition 8 that extends between the inlet and outlet ports and is provided with a port opening 9 that affords a passage between the inlet and outlet ports. In opposite portions the casing 5 is provided with internally threaded openings 10 and 11, these openings being in coaxial alignment with one another and the partition port 9. The valve casing is illustrated as being interposed in a steam or water pipe including pipe sections A that are screw-threaded one into the intake port 6 and the other into the outlet port 7.

Normally frictionally seated in the partition port 9 is a removable sleeve-like annular valve seat 12 that has a tapered outer surface 12$^a$, and which is provided at its enlarged end with an external annular limiting flange 12$^b$ that normally rests against the partition 8. The tapered outer surface of the removable valve seat engages the sides of the partition port 9 with a wedging action that increases under increased inserting movements, and which wedging action is at maximum when the flange 12$^b$ comes into engagement with the partition. This wedging action firmly holds the valve seat against accidental movements from the port opening in the partition 8 and forms a tight and leak-proof joint between the valve seat and partition 8. The flanged end portion of the removable sleeve-like valve seat is preferably very smooth and rounded to provide an efficient seating surface for a valve disk 13 that is carried by the inner end of a valve stem 14 in a manner hereinafter described.

The valve stem 14 works axially through and has screw-threaded engagement with a removable valve bonnet 15 at 16. This bonnet is of the conventional character and normally closes the body opening 11, the bonnet having external screw-threads that normally engage the internal screw-threads of the opening 11 but are for reasons hereinafter made apparent also engageable with the threads of either of the body openings 10 or 11. At its outer end valve stem 14 is provided with a detachable hand-wheel 17.

Placing the valve seat 12 in an operative position in the partition port 8 is most readily accomplished by hand through the body opening 11 and with the bonnet 15 removed. The valve seat is pressed into light or initial wedging engagement with the partition by finger pressure and then the bonnet 15 is screwed into the body opening and the valve stem and disk are employed to press the valve seat into complete wedging engagement with the partition. The pressure obtainable by means of the screw-threaded stem is so great that very little effort is required to press the valve seat 12 completely into the port 9, even though the wedging action of the seat on the partition is comparatively great. In the arrangement illustrated in Fig. 1, the body opening 10 is normally closed by a screw-threaded plug 18 that is interchangeable with the bonnet 15.

Figure 2:
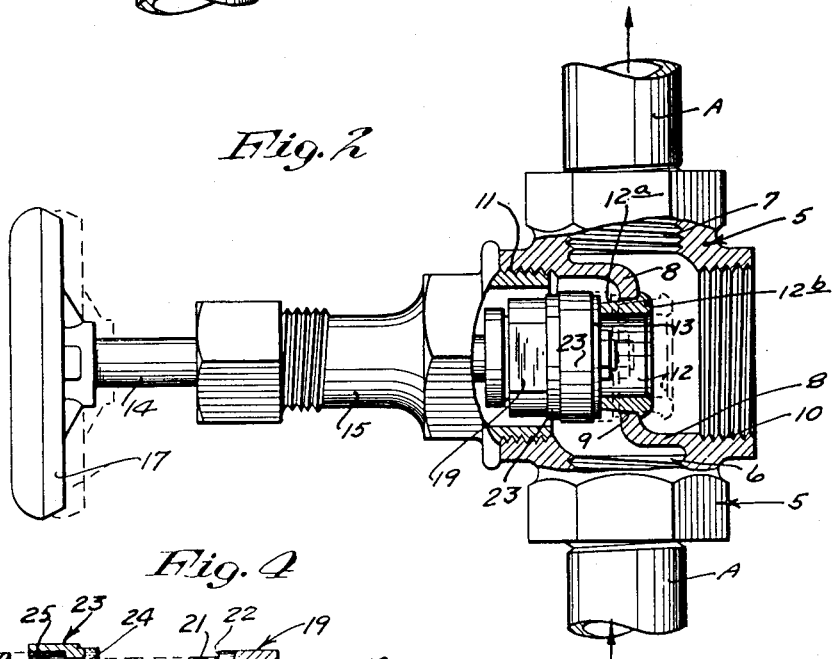
Fig. 2 is a view similar to Fig. 1 showing certain of the parts in a reverse relation and some parts removed and omitted.

To remove the wedge fit valve seat 12, the plug 18 and bonnet 15 are removed from their respective openings 10 and 11, the bonnet is screwed into the opening 10 to replace the plug 18, as illustrated in Fig. 2, and the valve disk and stem are employed as a press to force the seat out of wedging engagement with the partition. This method of removing the wedge fit valve seats is highly important in that it permits easy and speedy removal of the seat without danger of damaging any portion of the valve body or seat.

In practice it is customary to place emergency valves in steam or water pipes ahead of the customarily used service valves, the former being used to cut off flow through the pipe while repairs are being made to the latter. This practice of duplicating complete valves is very objectionable: first, because of the cost of the duplicate valves, and second, because of the duplicate labor required to install the emergency valves.

Figure 3:
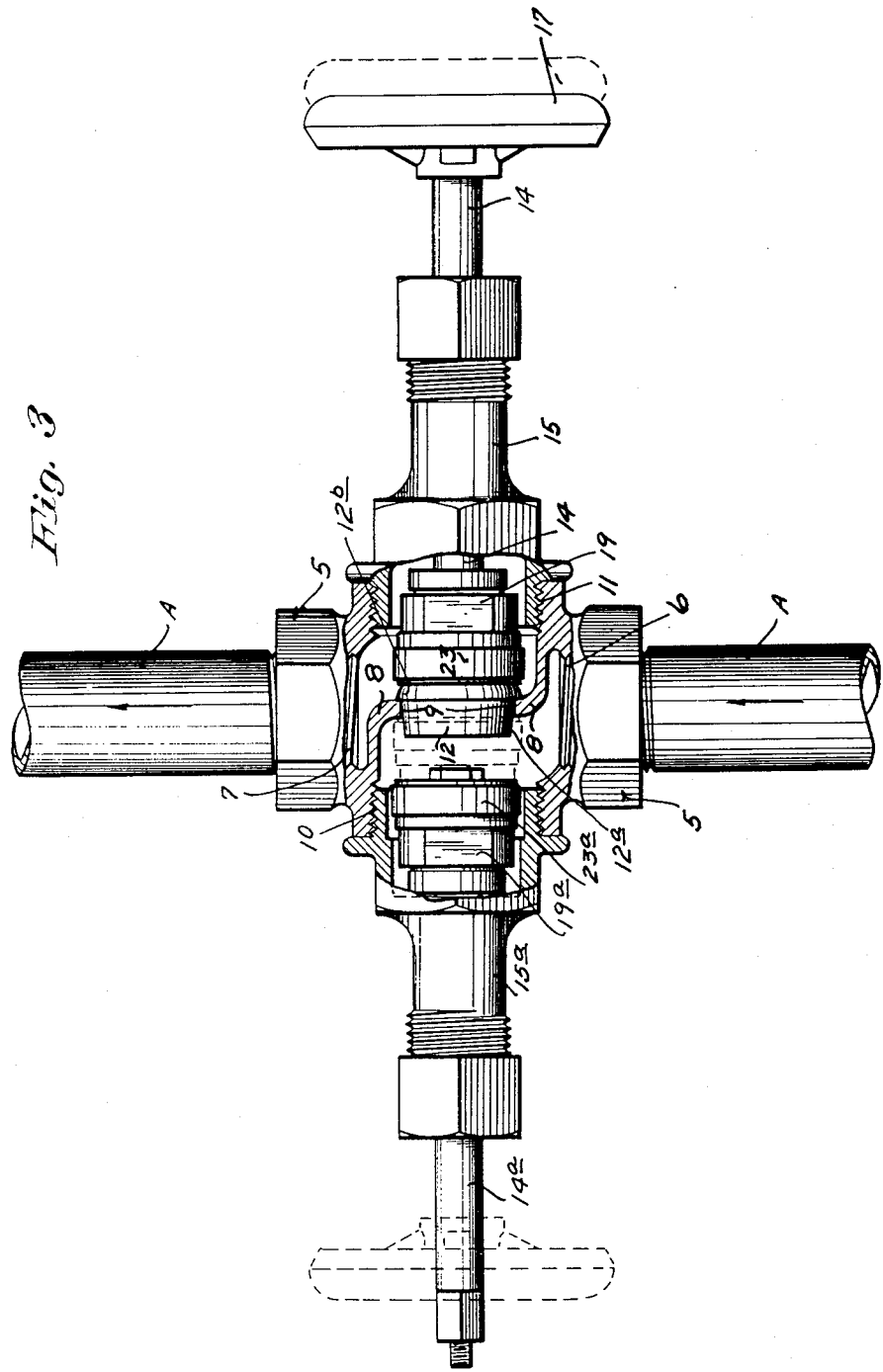
Fig. 3 is a view similar to Figs. 1 and 2 but illustrating certain parts in duplicate opposed arrangement.

When valves made in accordance with my invention are employed all of the advantages of the above noted duplicate valve arrangement and other advantages are obtainable at a material saving in material and labor. For example, in accordance with my invention, when it is desired to provide means for locally cutting off the flow through a pipe while repairs are being made to a service valve I substitute for the plug 18, shown in Fig. 1, a bonnet 15ª shown at the right in Fig. 3. This bonnet 15ª is a duplicate of the bonnet 15, shown in Figs. 1 and 2 and at the right in Fig. 3 and carries a valve stem 14ª that is a duplicate of the valve stem 14 and which valve stem is provided with a valve disk 13ª that is a duplicate of the valve disk 13. The valve disk 13ª and stem 14ª will normally remain in their outer inoperative positions, indicated by full lines in Fig. 3, and will be moved to their inner operative positions only when it is desired to make repairs to the parts used in regular service. The valve stem 14ª being like the stem 14 is capable of receiving a hand-wheel like or the hand-wheel 17 of the stem 14 but such hand-wheel is preferably omitted for the sake of easy distinction between the service valve stem 14 and the emergency valve stem 14ª and is applied only when it is desired to use the stem 14ª, and its disk 13ª.

When it becomes necessary to make repairs to the valve, that is to say, to change the removable valve seat 12, the valve disk 13 or the other parts subject to wear, the valve disk 13 is moved by means of its handle-equipped stem 14 to an open inoperative position. A suitable hand-wheel is applied to the emergency valve stem 14ª and which may be the hand-wheel of the valve stem 14. The valve stem 14ª and disk 14 are now screwed into engagement with the adjacent end of the valve seat 12 and employed as a press for moving the valve seat out of wedging engagement with the partition. The valve disk 13ª is of larger diameter than the partition port 9 and will, when it has moved the seat beyond its side of the partition, seat against the portion of the partition surrounding the port 9 and cut off flow through the port 9. The disk 13ª is, as will be noted by direction arrows on Fig. 3, on the intake or pressure side of the partition 8 and will therefor, when closed against the partition, cut off the opposite bonnet 15 side of the body from the pressure side of the pipe and permit safe removal of the bonnet 15 and parts carried thereby. When the bonnet 15 is removed, the seat 12 may be readily removed from the partition port 9 as the seat will now be in only very light frictional engagement with the partition 8. In re-assembling the parts the valve disk 13 and stem 14 will, of course, be employed to force the old or a new seat 13, as the case may be, back into the port 9.

Figure 4:
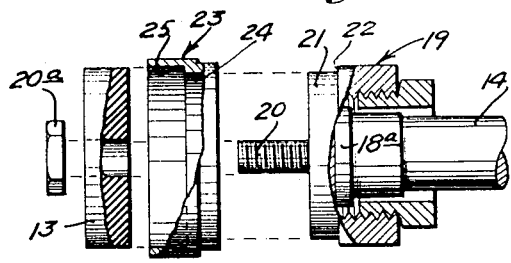
Fig. 4 is an enlarged view showing certain elements of the valve in disassembled relation, some portions being shown in side elevation, some portions being broken away and some portions being shown in axial section.

Connection between the valve stem 14 and its disk 13 is accomplished in the following novel and highly desirable manner. The stem 14 is provided at its inner end with a radially projecting flange 18ª. Detachably swiveled to the flanged end of the stem 14 is a head 19 having an axially projecting screw-threaded stem 20 and a reduced inner end portion 21 that affords an annular shoulder 22. The disk 13 is retained in a disk retaining ring 23 that has a reduced portion 24. The reduced portion 24 of this ring 23 fits over the reduced portion 21 of the head 19 and affords a seating shoulder 25 for the disk 13, which disk, when in place, projects slightly beyond the end of the ring. When the disk 13, retaining ring 23 and reduced portion 24 are in assembled relation the stem 20 extends axially through the disk and a nut 20ª is applied to the end thereof to clamp the parts thereon tightly together. It will be noted, by reference to Figs. 1 and 4 of the drawings, that the reduced portion 24 of the retaining ring 23 is of substantially the same depth as the telescopically engaged reduced portion 21 of the head 19 so that when the parts are clamped together by the nut 20ª and stem 20 the disk will be brought into tight face to face engagement with the free end of the head 19 and thereby prevent leakage through the axial portion of the disk surrounding the stem 20.

The disk 13 is originally loosely fitted in the ring 23 but after a period of service will often become so circumferentially enlarged that it will very tightly fit the ring. However, with the ring and disk removed as a unit from the head 19 the disk can usually be forced out of the ring by pressure applied through the open back-side of the ring without damaging the ring. If the disk becomes frozen in the ring it may be necessary to place the disk face down upon a support and chip or break the same so as to entirely remove it from the ring but this can also readily be accomplished without damaging the ring. The valve disk 13ª and its stem 14 are connected to one another in exactly the same manner as the disk 13 and its stem 14, described and indicated by like characters.

What I claim is:

1. In a valve a hollow body having inlet and outlet ports, a partition between said inlet and outlet ports having a port opening therein, an annular valve seat frictionally seated in said partition port and being removable therefrom in only one axial direction, like openings in opposite sides of the body and in co-axial alignment with said partition port and valve seat, a removable bonnet normally closing the said body opening at the side of the partition toward which the annular valve seat is axially removable, an axially movable valve member carried by said bonnet for movements into and out of engagement with said seat and tending when pressing against the seat to force the same into tighter frictional engagement with the partition, and removable means normally closing the other of said valve body openings, said last noted closing means and said bonnet being interchangeable so that said bonnet may be substituted for the said last noted closing means and the movable valve member thereof employed to force the annular seat out of its partition port.

2. In a valve a hollow body having inlet and outlet ports, a partition between said inlet and outlet ports having a port opening therein, an annular valve seat frictionally seated in said partition port and being removable therefrom in only one axial direction, like openings in opposite sides of the body and in co-axial alignment with said partition port and valve seat, like and interchangeable removable bonnets normally closing said body openings, substantially like movable valve members carried by said bonnets in axially aligned opposed relation for engagement with opposite ends of said annular valve seat, the movable valve member at the side of said body toward which the annular valve seat is removable constituting a service valve member and tending, when brought into engagement with the seat, to press the same into tighter frictional engagement with the partition, and the other valve member constituting an emergency valve member and being operative to press the valve seat out of frictional engagement with the partition and thereafter engage the partition and close the port therein, thereby stopping flow through the valve body and permitting removal of the seat, service valve member and its bonnet for repair.

3. In a valve, a valve stem, a head carried by one end of said stem and having an axially extended screw-threaded projection and a radial shoulder, a detachable valve disk retaining ring telescoped over said head, seated against the shoulder and projecting beyond the free end of the head and having an internal shoulder, a valve disk contained in said retaining ring and seated against the internal shoulder thereof, the said screw-threaded projection of said head extending through the disk, and a nut applied to the extended end of said projection to clamp the head, ring and disk together.

4. In a valve, a valve stem, a head carried by one end of said stem and having a radial shoulder, a detachable valve disk retaining ring telescoped over said head, seated against the shoulder, projecting beyond the free end of the head and having an internal shoulder approximately adjacent the free end of the head, a valve disk contained in said retaining ring beyond its internal shoulder, being of greater diameter than said shoulder and seated against the free end of the head, a screw-threaded stem carried by and projecting axially from the head through the valve disk and a nut applied to the extended end of the screw-threaded stem for clamping the head, ring and disk against axial separation and the disk in sealing contact with the free end of said head.

GEORGE M. CROSSEN.